United States Patent
Chou et al.

(10) Patent No.: US 7,598,789 B2
(45) Date of Patent: Oct. 6, 2009

(54) SIGNAL TRANSFERRING SYSTEM WITH UNEQUAL LENGTHS OF CONNECTING PATHS AND METHOD THEREOF

(75) Inventors: Tsung-Lian Chou, Keelung (TW); Yi-Lin Chen, Taipei (TW); Cheng-Hsin Chang, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 11/843,651

(22) Filed: Aug. 23, 2007

(65) Prior Publication Data

US 2008/0054968 A1    Mar. 6, 2008

(30) Foreign Application Priority Data

Aug. 24, 2006   (TW) ............................. 95131120 A

(51) Int. Cl.
   *G06F 1/04* (2006.01)
   *H03K 3/00* (2006.01)
(52) U.S. Cl. ..................................... 327/291; 327/108
(58) Field of Classification Search ................ 327/108, 327/291, 261–262, 86, 30
   See application file for complete search history.

(56) References Cited

U.S. PATENT DOCUMENTS

| 6,360,081 | B1 * | 3/2002 | Yamauchi | 455/88 |
| 6,469,550 | B1 | 10/2002 | Kurd | |
| 7,196,557 | B1 * | 3/2007 | Kwasniewski et al. | 327/108 |
| 7,292,666 | B2 * | 11/2007 | Fukuma | 375/358 |
| 2003/0043926 | A1 | 3/2003 | Terashima | |
| 2003/0084365 | A1 | 5/2003 | Kubo | |

* cited by examiner

*Primary Examiner*—Dinh T. Le
(74) *Attorney, Agent, or Firm*—Winston Hsu

(57) ABSTRACT

The present invention relates to a signal transferring system. The signal transferring system includes a first and second layout paths, and a first and second circuits. Lengths of the first and second layout paths are different. The first and second circuits are used for transmitting and receiving at least two signals respectively. In addition, one of the first circuit and the second circuit includes a compensation circuit for adjusting transmission time of one of the at least two transferred signals or adjusting reception time of one of the at least two transferred signals such that the at least two transferred signals reach a second circuit through the first and the second layout paths at substantially the same time.

15 Claims, 4 Drawing Sheets

SIGNAL TRANSFERRING SYSTEM WITH UNEQUAL LENGTHS OF CONNECTING PATHS AND METHOD THEREOF

BACKGROUND OF THE INVENTION

1. Field of the Invention

The present invention relates to a signal transferring system and method thereof, and more particularly to a signal transferring system with unequal transferring paths and method thereof.

2. Description of the Prior Art

The constantly increasing system operating frequency of electronic apparatuses has resulted in many challenges when designing an interface between electronic apparatuses. For example, the input/output interface of a DDR SDRAM (Double Data Rate SDRAM) has to operate at a high speed (i.e. $\geq 100$ MHz) clock, in which two data bits should be read in a single clock cycle. In other words, one data bit is read in the rising edge and the other data bit is read in the falling edge of the clock. Therefore, the reading time of one data bit is relatively short. Accordingly, the phases of the clock and data have to be locked precisely in order to read the data accurately. Furthermore, the input/output interface of the memory is required to utilize the pulse of a data strobe signal for sampling the 8 bits/16 bits data (DQ), therefore the layout lengths for the data signal and the relative data strobe signal on the circuit board have to be the same. Larger amounts of layout numbers, higher data transmitting speed, and more complicated operation of the circuit system will increase the difficulty of designing the circuit board. Furthermore, for the sake of equalizing the delay time of each layout path, the layout on the circuit board should be designed to have the shortest possible lengths and smallest possible area. The transmission line effect that emerges when operating at a high data speed will affect the normal operation of the electronic apparatus. Moreover, because the data of the DDR memory is transmitted at very high speeds, (8 bits/16 bits at a time), the power/ground bouncing noise that emerges at the input/output pad of the memory controller will seriously damage the signal accuracy of the analog circuit within the SoC (System on Chip) device, such as a digital to analog converter.

SUMMARY OF THE INVENTION

Therefore, one of the objectives of the present invention is to provide a signal transferring system with unequal transmission paths and a method thereof to solve the above-mentioned layout problems caused by the large amounts of layout numbers, high data transmitting speed, and complicated operation of the circuit system.

According to an embodiment of the present invention, a signal transferring system is provided. The signal transferring system comprises a first and second layout paths, a first and second circuits, wherein the first and second layout paths are coupled between the first circuit and the second circuit, and a length of the first layout path is different from a length of the second layout path. The first circuit is used for transmitting at least two transferred signals; and the second circuit is used for receiving the at least two transferred signals. One of the first circuit and the second circuit comprises a compensation circuit, wherein the compensation circuit is used for adjusting transmission time of one of the at least two transferred signals or adjusting reception time of one of the at least two transferred signals such that the at least two transferred signals reach a second circuit through the first and the second layout paths at substantially the same time.

According to another embodiment of the present invention, an apparatus for transferring at least two transferred signal system is provided. The apparatus comprises: a first terminal, a second terminal, an interface, and a compensation circuit. The first and second terminals are respectively coupled to a first and second layout paths for transferring the at least two transferred signal, wherein a length of the first layout path is different from that of the second layout path. The interface is coupled to the first and the second terminals for receiving or outputting the at least two transferred signals. The compensation circuit is coupled to the interface for adjusting transmission time of one of the at least two transferred signals or adjusting reception time of one of the at least two transferred signals such that the at least two transferred signals reach a second circuit through the first and the second layout paths at substantially the same time.

The first transmission path has a first length, for transmitting a first transmitting signal; and the second transmission path has a second length, for transmitting a second transmitting signal, the first length being different from the second length; and a transmitting circuit is coupled to the first transmission path and the second transmission path. The transmitting circuit comprises: a first buffer for driving the first transmitting signal to the first transmission path; and a second buffer for driving the second transmitting signal to the second transmission path; wherein the time when the first buffer drives the first transmitting signal and the time when the second buffer drives the second transmitting signal are not the same, thereby allowing the first transmitting signal and the second transmitting signal to reach a receiving circuit at substantially the same time.

According to another embodiment of the present invention, a method for transferring first and second transferred signals is provided. The method comprises: providing first and second terminals, respectively coupled to first and second layout paths, to transfer the first and second transferred signals, wherein a length of the first layout path is different from that of the second layout path; and adjusting transmission time of at least one of the first and second transferred signals or adjusting reception time of at least one of the first and second transferred signals by a compensation circuit such that the at least two transferred signals reach a second circuit through the first and the second layout paths at substantially the same time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
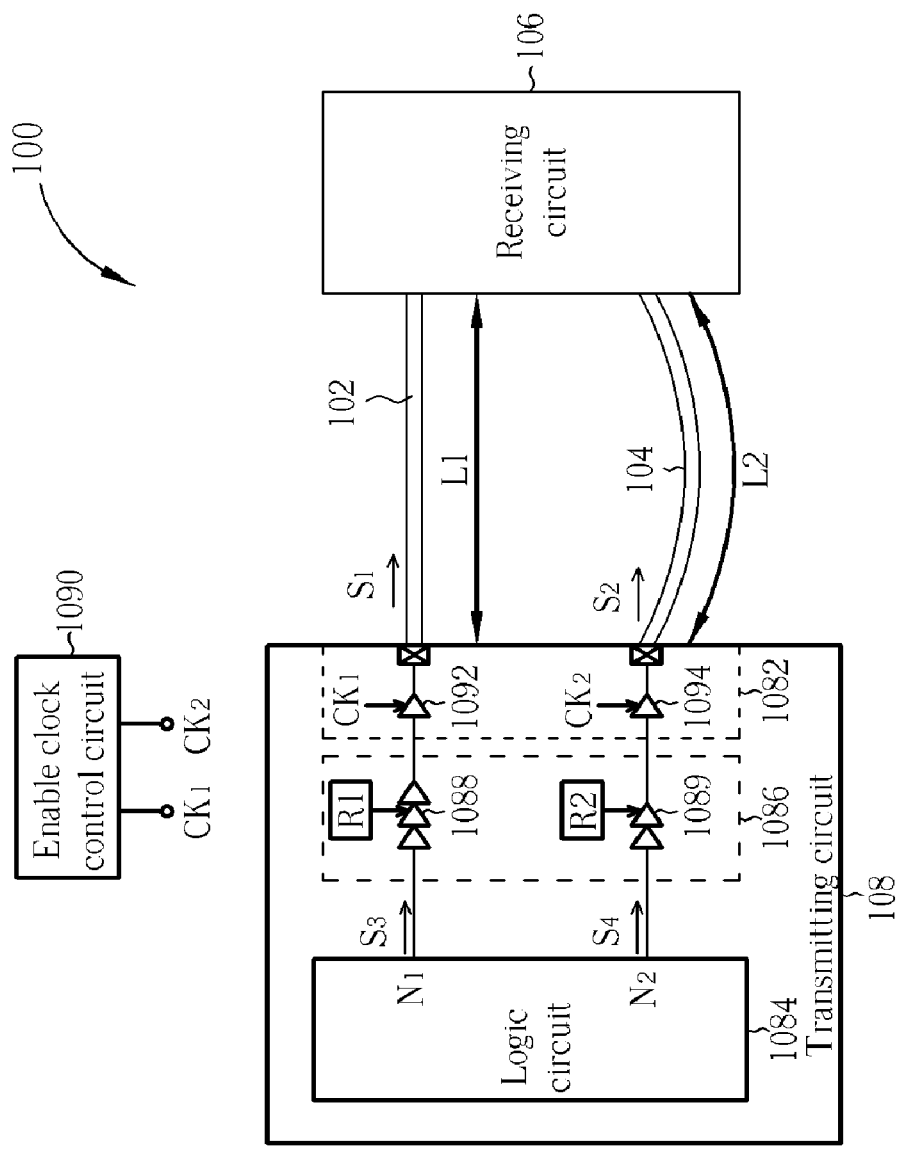
FIG. 1 is a diagram illustrating the signal transferring system according to a first embodiment of the present invention.

Please refer to FIG. 1. FIG. 1 is a diagram illustrating a signal transferring system 100 according to an embodiment of the present invention. The transferring system 100 comprises a first transmission path 102, a second transmission path 104, a receiving circuit 106, and a transmitting circuit 108, wherein the receiving circuit 106 is coupled to the first transmission path 102 and the second transmission path 104. In this embodiment, the first transmission path 102 has a first length L1 for transmitting a first transmitting signal $S_1$, the second transmission path 104 has a second length L2 for transmitting a second transmitting signal $S_2$, and the first length L1 is smaller than the second length L2. Please note that, for brevity, there are only two transmission paths shown in FIG. 1; however, this is not a limitation of the present invention. For example, when the receiving circuit 106 is a double data rate II (DDRII) memory, there will be 16 transmission paths coupled between the receiving circuit 106 and the transmitting circuit 108 (e.g., a memory controller of the DDR memory).

In FIG. 1, the receiving circuit 106 is coupled to the first and the second transmission paths 102, 104, and receives the first and the second transmitting signals $S_1$, $S_2$. The transmitting circuit 108 comprises a transmission interface 1082, a logic circuit 1084, and a delay module 1086. The transmission interface 1082 is coupled to the first and the second transmission paths 102, 104 for outputting the first and the second transmitting signals $S_1$, $S_2$. The logic circuit 1084 is utilized for generating a first output signal $S_3$ and a second output signal $S_4$. The delay module 1086 is utilized for delaying at least one of the first and second output signals $S_3$, $S_4$ by a first delay amount $t_1$ to generate the first and the second transmitting signals $S_1$, $S_2$, in which the first and the second transmitting signals $S_1$, $S_2$ correspond to the first and second output signals $S_3$, $S_4$ respectively. This is to ensure the first and the second transmitting signals $S_1$, $S_2$ reach the receiving circuit 106 at substantially the same time. In this embodiment, the delay module 1086 comprises a first delay unit 1088 for providing the first delay amount $t_1$ (stored in a first register R1) to delay the first output signal $S_3$ and then generate the first transmitting signal $S_1$, and a second delay unit 1089 for providing a second delay amount $t_2$ (stored in a second register R2) to delay the second output signal $S_4$ and then generate the second transmitting signal $S_2$. In other words, the delay unit delays a transferred signal according to the delay amount stored in a corresponding register.

Furthermore, an enable control circuit 1090 generates a first enable clock $CK_1$ and a second enable clock $CK_2$ for respectively controlling the buffers 1092, 1094 of the transmission interface 1082, and the buffers 1092, 1094 to drive the first and the second transmitting signals $S_1$, $S_2$ into the first and the second transmission paths 102, 104 respectively.

Please note that the first delay amount $t_1$ and the second delay amount $t_2$ should be designed so the first and the second transmitting signals $S_1$, $S_2$ reach the receiving circuit 106 at substantially the same time. Additionally, at least one of the first delay amount $t_1$ and the second delay amount $t_2$ is programmable/adjustable. In another embodiment, the second delay unit 1089 in FIG. 1 can be eliminated, as long as the first and the second transmitting signals $S_1$, $S_2$ can also reach the receiving circuit 106 at substantially the same time.

In this embodiment, the first transmission path 102 and the second transmission path 104 are the layout paths on the PCB board, and the receiving circuit 106 and the transmitting circuit 108 are installed on the PCB board; however this is not a limitation of the present invention.

The objective of the delay module 1086 is to calibrate the arriving times of the first and the second transmitting signals $S_1$, $S_2$, although those skilled in this art can easily modify the embodiment of the present invention to obtain the above-mentioned objectives. For example, setting the transmitting time of a specific transmission path as a reference time, then delaying the signals of the other transmission paths with corresponding delay amounts by the reference time for calibration also belongs to the scope of the present invention.

For example, if the transmitting times of the first and the second transmitting signals $S_1$, $S_2$ on the first and the second transmission paths 102, 104 are $t_5$, $t_6$ respectively, then the second delay unit 1089 in the delay module 1086 delays the second output signal $S_4$ of the second transmission path 104 having a longer length of $L_2$ by a shorter second delay amount $t_2$; and the first delay unit 1088 delays the first output signal $S_3$ of the first transmission path 102 having a shorter length of L1 by a longer first delay amount $t_1$. Please refer to FIG. 1 again. The delayed first and second output signals $S_3$, $S_4$ reach the transmission interface 1082 at different times (e.g. $t_3$ and $t_4$), wherein $t_3=t_0+t_1$, $t_4=t_0+t_2$. Simultaneously, the enable clock control circuit 1090 controls the first enable clock $CK_1$ and the second enable clock $CK_2$ to turn on the buffers 1092,1094 in the transmission interface 1082 at time $t_3$ and $t_4$, respectively, and drive the first and the second output signal $S_3$, $S_4$ into the first and the second transmission paths 102, 104 to become the first and the second transmitting signals $S_1$, $S_2$ respectively. Because the first and the second transmission paths 102, 104 have different lengths of L1 and L2, therefore the first and the second transmitting times $t_5$, $t_6$ of the first and the second transmitting signals $S_1$, $S_2$ on the first and the second transmission paths 102, 104 are different. However, if $t_1+t_5=t_2+t_6$, then the first and the second transmitting signals $S_1$, $S_2$ will reach the receiving circuit 106 concurrently. In other words, the first and the second output signals $S_3$, $S_4$ generated by the logic circuit 1084 will reach the receiving circuit 106 concurrently if $t_1+t_5=t_2+t_6$, even though the first and the second transmission paths 102, 104 have different lengths of L1 and L2. In this embodiment, the combination of the enable clock control circuit 1090 and the delay module 1086 serves as a compensation circuit for adjusting transmission time of at least one of two transferred signals.

In other hand, the embodiment of the present invention not only reduces the layout area between the receiving circuit 106 and the transmitting circuit 108 but also discloses that the first enable clock $CK_1$ and the second enable clock $CK_2$ will activate the buffers 1092, 1094 in the transmission interface 1082 at different times (t3 and t4), meaning that the first and the second transmitting signals $S_1$, $S_2$ are generated at different times in the transmission interface 1082. Accordingly, the power/ground bouncing noise of each of the input/output pad (IO pad) of the transmission interface 1082 can be reduced. In other words, the noise generated by the embodiment of the present invention can be reduced.

Figure 2:
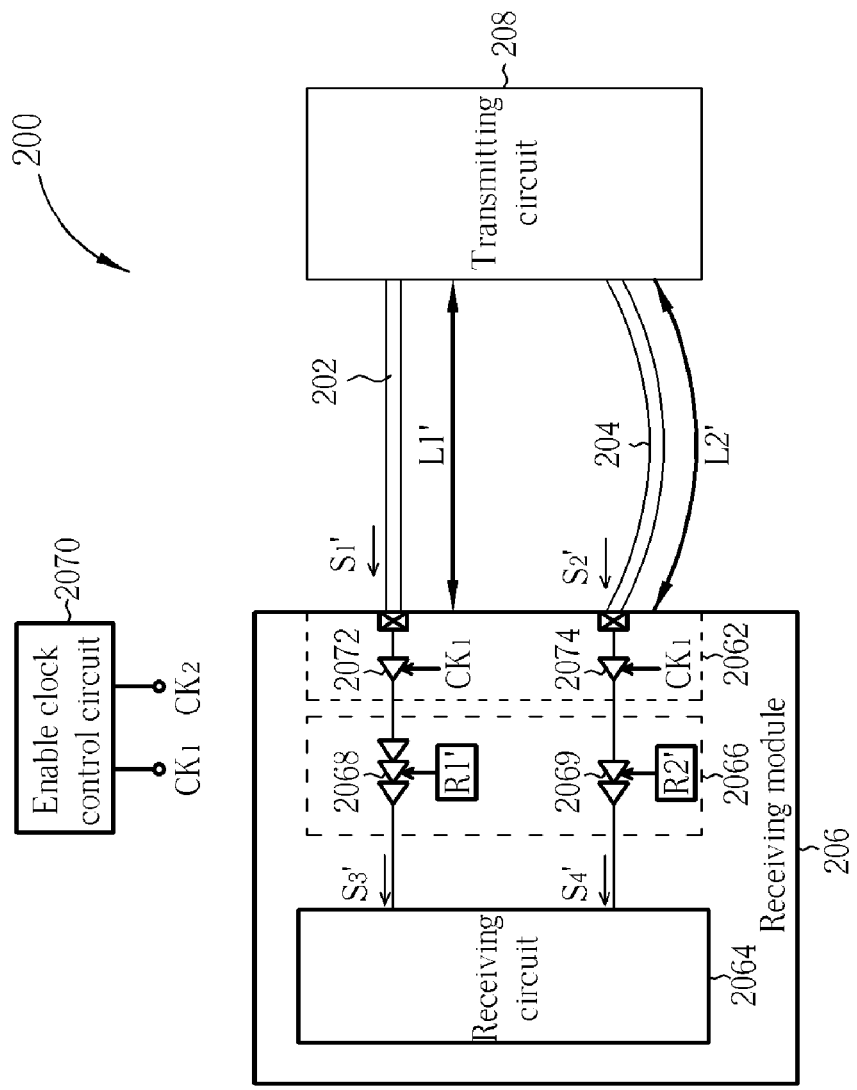
FIG. 2 is a diagram illustrating the signal transferring system according to a second embodiment of the present invention.

Furthermore, the present invention can be applied in a receiving circuit. Please refer to FIG. 2. FIG. 2 is a diagram illustrating a signal transmitting system 200 according to the second embodiment of the present invention. In this embodiment, the receiving module 206 comprises a transmission interface 2062 having buffers 2072 and 2074, a receiving circuit 2064, and a delay module 2066 having first and second delay units 2068 and 2069 and first and second registers R1' and R2' storing delay amounts t1' and t2' referenced by the first and second delay units 2068 and 2069. Additionally, at least one of the first delay amount $t_1'$ and the second delay amount $t_2'$ is programmable/adjustable. In order to describe the present invention in more detail, a transmitting circuit 208 is further coupled to the first transmission path L1' and the second transmission path L2'. The delay module 2066 has a similar configuration and operation to the delay module 1086 of FIG. 1; and the enable clock control circuit 2070 has a similar configuration and operation to the enable clock control circuit 1090 of the FIG. 1, and details are therefore omitted here for brevity. It should be noted that the combination of the enable clock control circuit 2070 and the delay module 2066 serves as a compensation circuit for adjusting reception time of at least one of the transferred signals.

Please note that, in the above-mentioned first embodiment, only the transmitting circuit 108 has the delay module 1086 installed, and in the second embodiment, the delay module 2066 is installed on the receiving module 206. However, in another embodiment, if a circuit device is designed to have the functions of transmitting and receiving, then the above-mentioned mechanism that calibrates the signal receiving time at the receiving circuit 106 and the mechanism that calibrates the signal receiving time at the logical circuit 1084 can be integrated into the circuit device.

Figure 3:
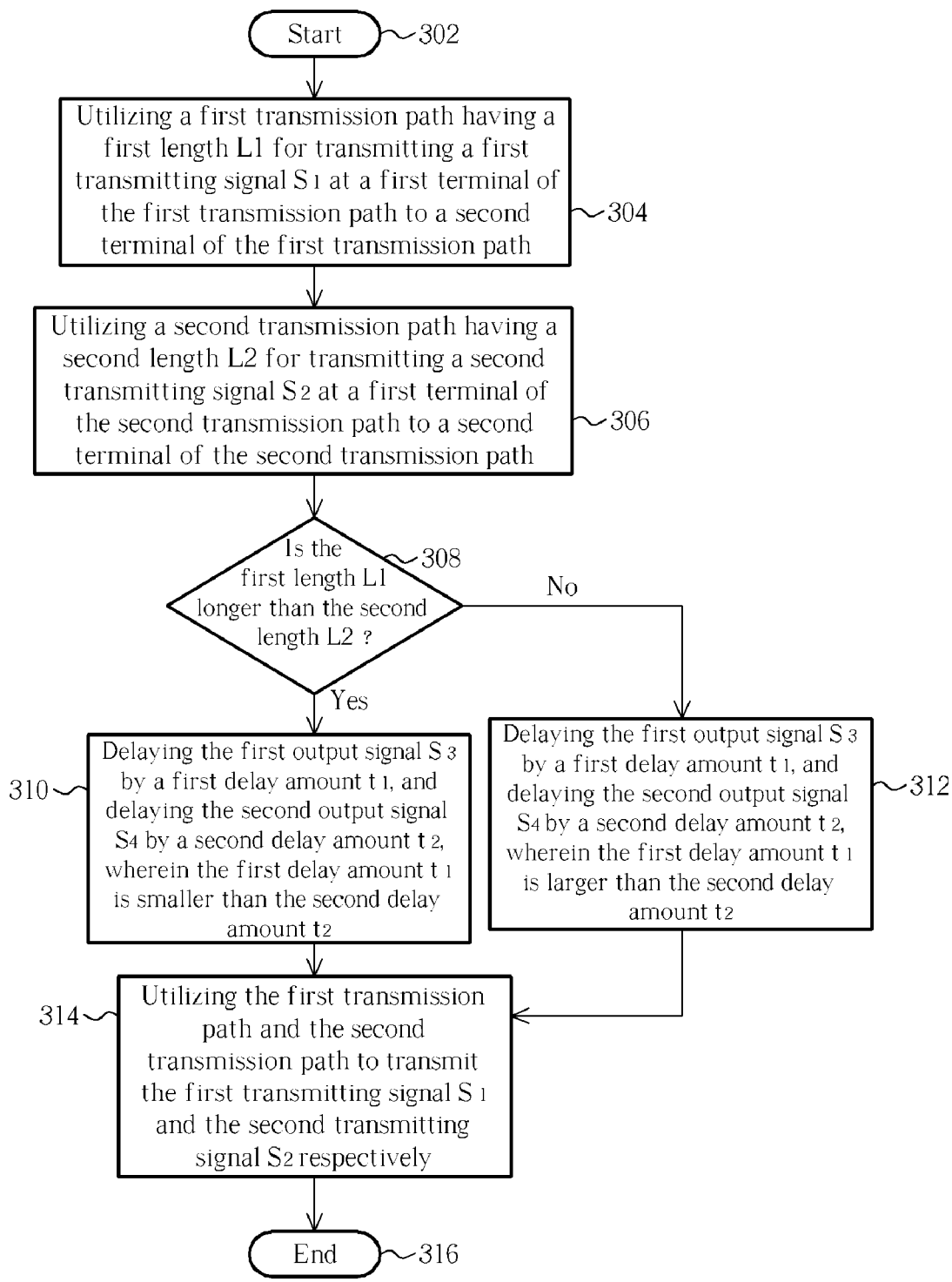
FIG. 3 is a flow chart of the signal transferring method according to the first embodiment of the present invention.

Please refer to FIG. 3. FIG. 3 is a flow chart of the signal transferring method according to a first embodiment of the present invention. Because the signal transferring method of the present invention is implemented by the signal transferring system 100 of FIG. 1, detailed description is omitted here for brevity. The objectives of step 310 to step 312 are to calibrate the receiving times of the first and second transmitting signals $S_1$, $S_2$ at the receiving circuit 106 respectively.

Figure 4:
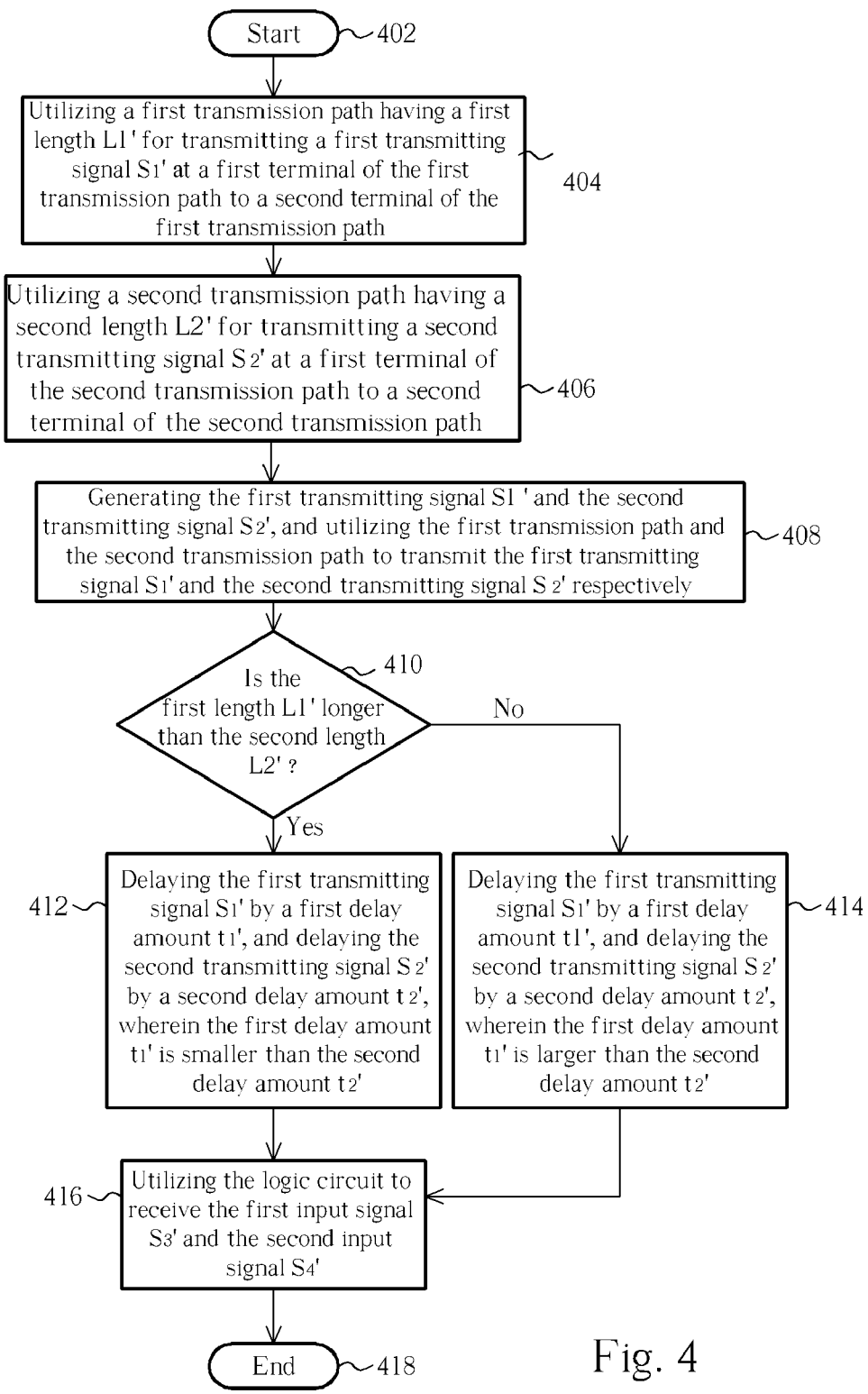
FIG. 4 is a flow chart of the signal transferring method according to the second embodiment of the present invention.

Please refer to FIG. 4. FIG. 4 is a flow chart of the signal transferring method according to a second embodiment of the present invention. Because the signal transferring method of the present invention is implemented by the signal transferring system 200 of FIG. 2, detailed description is omitted here for brevity. The objectives of step 412 to step 414 are to calibrate the receiving times of the first and second inputting signals $S_3'$, $S_4'$ at the receiving circuit 2064 respectively. The inputting signals $S_3'$, $S_4'$ respectively correspond to transmitting signals $S_1'$, $S_2'$ outputted from the transmitting circuit 208.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transferring system comprising:
    a first circuit for transmitting at least two transferred signals;
    a second circuit for receiving the at least two transferred signals;
    first and second transmission paths, coupled between the first circuit and the second circuit, wherein a length of the first transmission path is different from that of the second transmission path;
    at least one register for storing at least one delay amount; and
    at least one delay unit, coupled to at least one of the first and the second transmission paths, for delaying at least one of the at least two transferred signals according to the delay amount;
    wherein one of the first circuit and the second circuit comprises a compensation circuit for adjusting transmission time of one of the at least two transferred signals or adjusting reception time of one of the at least two transferred signals such that the at least two transferred signals reach a second circuit through the first and the second transmission paths at substantially the same time.

2. The system of claim 1, wherein the at least one delay amount is adjustable.

3. The system of claim 1, wherein the compensation circuit comprises:
    a control circuit, for generating a first clock and a second clock; and
    the system further comprises first and second buffers, respectively coupled to the first and the second transmission paths, for asynchronously outputting the at least two transferred signals according to the first clock and the second clock.

4. The system of claim 3, wherein the compensation circuit comprises:
    at least one delay unit, coupled to at least one of the first and the second buffers, for delaying at least one of the at least two transferred signals.

5. The system of claim 1, wherein the first circuit is a memory controller or a memory.

6. The system of claim 5, wherein the memory is a double data rate (DDR) memory.

7. An apparatus for transferring at least two transferred signal, comprising:
    first and second terminals, respectively coupled to first and second transmission paths, for transferring the at least two transferred signal, wherein a length of the first transmission path is different from that of the second transmission path;
    an interface, coupled to the first and the second terminals, for receiving or outputting the at least two transferred signals;
    a compensation circuit, coupled to the interface, for adjusting transmission time of one of the at least two transferred signals or adjusting reception time of one of the at least two transferred signals such that the at least two transferred signals reach the second circuit through the first and the second transmission layout paths at substantially the same time;
    at least one register for storing at least one delay amount; and
    at least one delay unit, coupled to at least one of the first and the second terminals, for delaying at least one of the at least two transferred signals according to the at least one delay amount.

8. The apparatus of claim 7, wherein the at least one delay unit comprises:
    a first delaying unit, for delaying the first transferred signal by a first delay amount; and
    a second delaying unit, for delaying the second transferred signal by a second delay amount;
    wherein the first and the second delay amounts are adjustable and correspond to the lengths of the first and the second transmission paths.

9. The apparatus of claim 7, wherein the at least one delay amount is adjustable.

10. The apparatus of claim 7, wherein the compensation circuit comprises a control circuit, for generating a first clock and a second clock; and the interface comprises first and second buffers, respectively coupled to the first and the second terminals, for asynchronously outputting the at least two transferred signals according to the first clock and the second clock.

11. A method for transferring first and second transferred signals, comprising:
    providing first and second circuits, respectively coupled to first and second transmission paths, to transfer the first and second transferred signals, wherein a length of the first transmission path is different from that of the second transmission path;

adjusting transmission time of at least one of the first and second transferred signals or adjusting reception time of at least one of the first and second transferred signals by a compensation circuit such that the at least two transferred signals reach the second circuit through the first and the second transmission paths at substantially the same time;

providing first and second clock signals to the compensation circuit; and respectively transferring the first and the second transferred signals according to the first and the second clock signals, wherein the first and the second clock signals have a phase difference corresponding to the lengths of the first and the second transmission paths.

12. The method of claim 11, wherein the step of adjusting transmission time of at least one of the first and second transferred signals or adjusting reception time of at least one of the first and second transferred signals farther comprises:

delaying the first transferred signal by a first delay amount; and delaying the second transferred signal by a second delay amount;

wherein the first and the second delay amounts are adjustable and correspond to the lengths of the first and the second transmission paths.

13. The method of claim 11, farther comprises:

delaying the first transferred signal by a first delay amount; and delaying the second transferred signal by a second delay amount;

wherein the first and the second delay amounts are difference.

14. A signal transferring system comprising:

a first circuit for transmitting at least two transferred signals;

a second circuit for receiving the at least two transferred signals;

first and second transmission paths, coupled between the first circuit and the second circuit, wherein a length of the first transmission path is different from that of the second transmission path; and a control circuit, for generating a first clock and a second clock;

wherein one of the first circuit and the second circuit comprises a compensation circuit for adjusting transmission time of one of the at least two transferred signals or adjusting reception time of one of the at least two transferred signals such that the at least two transferred signals reach a second circuit through the first and the second transmission paths at substantially the same time;

wherein the system further comprises first and second buffers, respectively coupled to the first and the second transmission paths, for controlling transmission of the at least two transferred signals according to the first clock and the second clock.

15. An apparatus for transferring at least two transferred signal, comprising:

first and second terminals, respectively coupled to first and second transmission paths, for transferring the at least two transferred signal, wherein a length of the first transmission path is different from that of the second transmission path;

an interface, coupled to the first and the second terminals, for receiving or outputting the at least two transferred signals; and a compensation circuit, coupled to the interface, for adjusting transmission time of one of the at least two transferred signals or adjusting reception time of one of the at least two transferred signals such that the at least two transferred signals reach a second circuit through the first and the second transmission layout paths at substantially the same time;

wherein the compensation circuit comprises a control circuit, for generating a first clock and a second clock; and the interface comprises first and second buffers, respectively coupled to the first and the second terminals, for controlling transmission of the at least two transferred signals according to the first clock and the second clock.

* * * * *